Jan. 30, 1951  O. F. WALKER  2,539,601
GLASS CUTTING TOOL
Filed June 7, 1949
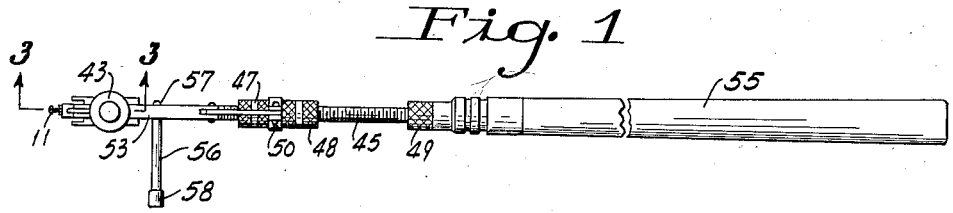
Fig. 1
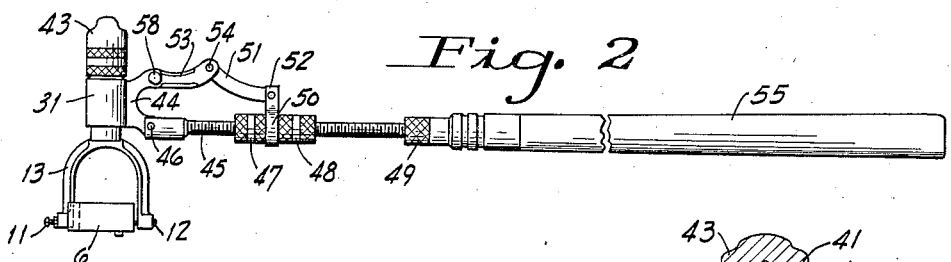
Fig. 2
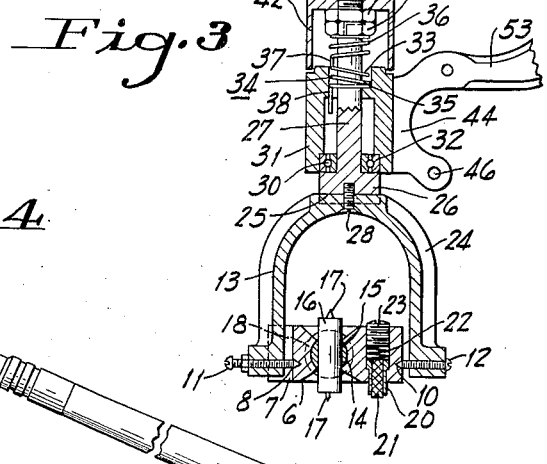
Fig. 3
Fig. 4
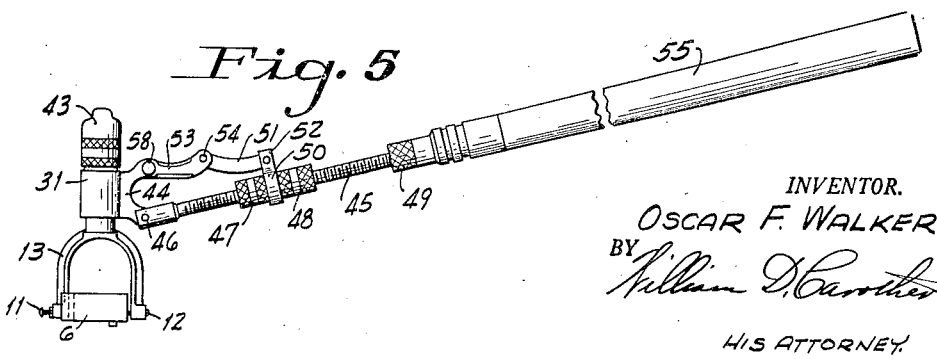
Fig. 5
INVENTOR.
OSCAR F. WALKER
BY William D. Carruthers
HIS ATTORNEY.

Patented Jan. 30, 1951

2,539,601

UNITED STATES PATENT OFFICE 2,539,601

GLASS CUTTING TOOL

Oscar F. Walker, Grapeville, Pa.

Application June 7, 1949, Serial No. 97,543

2 Claims. (Cl. 49—52)

This invention relates generally to glass cutting and more particularly to tools for cutting large sections of glass.

The glass cutting tool comprising this invention is a hand tool having a cutter carriage pivotally supported on a horizontal axis from a yoke that has a spindle swiveled on a vertical axis in a head attached to a handle. The cutter is adjustably mounted in the carriage to permit it to be positioned to obtain the most beneficial results scoring the glass. A cutting diamond is swaged in a ferrule which in turn is clamped in a split sleeve having spherical exterior swiveled within a complementary socket in the carriage. The side of the carriage is plain and extends beyond the yoke for engagement with a straight edge as the tool is drawn across the glass. The head in which the yoke spindle is swiveled has a bracket attached thereto. The handle for the tool is pivotally attached to the lower end of this bracket and an integral arm extends from the upper end of the bracket out over the handle. A link is pivotally secured at its ends to the arm and to a sleeve that is adjustable axially of the handle to provide angular adjustment between the vertical axis of the head or spindle and the handle. This adjustment permits the operator to prelocate his hand considerably above or closely adjacent the surface of the glass when drawing the tool thereacross. The handle is provided with a hand grip that may be short or long to suit the convenience of the operator. These structural features aid the operator in balancing the proper pressure on the cutter while drawing it across the glass.

A laterally projecting post is secured to the bracket to provide one of a tripoint support for the tool when laid on a table surface. This post also carries an oil wiping wick that is used to oil the glass along the path that the cutter is to travel. Another wiper is also provided on the carriage in front of the cutter.

Other objects and advantages appear in the following description and claims.

The accompanying drawings show, for the purpose of exemplification without limiting the invention or claims thereto, certain practical embodiments of the invention wherein:

Fig. 1 is a top plan view of the glass cutter comprising this invention;

Fig. 2 is a view in side elevation of the glass cutter with the handle straight;

Fig. 3 is a view in vertical section of the head of the glass cutter taken on the line 3—3 of Fig. 1;

Fig. 4 is a view showing the handle extending downwardly; and

Fig. 5 is a view showing the handle extending upwardly.

Referring to Figs. 1, 2 and 3 of the drawings, the glass cutter carriage 6 is made from a rectangular block having a slot 7 in one end thereof. Pivotal bearing notches 8 and 10 are provided in the slot and the opposite end of the block to receive the bearing screws 11 and 12, retained in aligned threaded holes in the ends of the arms of the yoke 13.

Close to the center of the cutter carriage is a spherical socket 14 for receiving the split sleeve 15 which has a complementary spherical surface to fit the socket 14. The split socket 15 is arranged to receive the cylindrical ferrule 16 having the diamonds or other cutting element 17 mounted therein. The side of the carriage block 6 is provided with a threaded opening to receive the set screw 18 which may be tightened on the split sleeve to lock it and the ferrule therein at any desired angular position for using the cutter 17.

Spaced from the cutter is the sleeve 20 stepped in a vertical bore and carrying the felt wick 21 which is held in an extended position by the spring 22 retained by the screw 23. This wick 21 is saturated with a lubricant which wets the glass ahead of the cutter as the latter is drawn over the glass.

The yoke 13 is provided with a reinforcing rib 24 and a flat seat 25 at the top which is straddled by the bifurcated base 26 of the spindle 27. The base is provided with a threaded hole to receive the machine screw 28 that passes through a clearance hole in the yoke. An antifriction bearing 30 has its central race pressed on the spindle 27, the upper end of which is threaded. The head 31 is in the form of a sleeve having an enlarged lower bore forming a shoulder 32 to receive the outer race of the bearing 30. Toward the top of the head 31, the bore is reduced in diameter but clearance is provided for the spindle 27. Thus, the bearing 30 is entirely depended upon to freely support the spindle for rotation in the head 31. The top of the sleeve is bored out to provide the recess 33 around the spindle to receive part of the helically wound spring 34. The lower part 35 of the spring is wound counterclockwise and the upper part 36 is wound clockwise when viewed from above. The reverse of this spring is made at the bend 37. The end of the coil 35 extends through the hole 38 in the bottom of the recess 33, thus being attached to the head. The upper end of the coil 36 passes through a hole in the nut 40 and is bent over lying in an annular trough. The nut 40 is locked to the spindle 27 by the nut 41 and the position of the nuts 40 and 41 on the spindle are accurately determined to properly gauge the skirt 42 of the cap 43 from the head.

When the cap 43 is tightly locked against the nut 41, the skirt of the cap has clearance with the head. Thus, the head is enclosed and dust and dirt are shut out without hindering the rotary swivel action of the spindle.

The spring 34 is assembled with the lower half 35 in the chamber 33, which coil section expands when the yoke rotates in a clockwise direction as to maintain the carriage block 6 in alignment with the plane of the bracket 44 and the handle 45 pivoted thereto as indicated at 46.

The handle 45 is threaded for its entire length for the purpose of receiving the threaded collars 47, 48, and 49. The collars 47 and 48 have the ring 50 therebetween. This ring is slidably mounted on the handle 45 and has an upwardly extending boss that is bifurcated to receive one end of the link 51 which is pivoted thereto as indicated at 52. The link 51 is curved and its other end is received in the bifurcated end of the arm 53 to which it is pivoted as indicated at 54. The arm 53 is integral with the bracket 44. Thus, by adjusting the ring 50 back and forth, the handle may be disposed at an angle relative to the axis of the spindle as illustrated in the three positions indicated by Figs. 2, 4 and 5.

The other end of the handle 45 has the threaded socket of the hand grip 55 screwed thereon and locked in place by the threaded collar 49. This hand grip may be one or more feet in length to suit the convenience of the operator.

A post 56, having a threaded end 57 secured to the arm 53, extends laterally of the bracket 44 for a considerable distance as shown in Fig. 1.

A wick 58 is mounted on the end of the post 56 which may be wetted with a lubricant and drawn across the glass before the cutter is oriented ninety degrees to cut the glass. This post also functions as the third point of a tripoint support for the tool, the carriage and the hand grip forming the other two points. This tripoint support facilitates picking up the tool and protects the cutting point when the tool is not in use.

I claim:

1. A glass cutting tool comprising a head, a yoke having a spindle journaled in said head, a cutter carriage pivotally supported on said yoke, a handle pivotally connected to said head, a link having one end pivotally connected to said head in spaced relation to the handle pivot, and a ring adjustably positioned along said handle and pivotally connected to the other end of said link to vary the angular position of the handle relative to the head and spindle.

2. The structure of claim 1 which also includes a continuous helical spring having two sections connected by a longitudinal portion, one spring section wound clockwise and the other wound counterclockwise, means to anchor the end of one spring section relative to the head, and means to anchor the end of the other spring section relative to the cutter carriage to resiliently maintain the cutter carriage in a predetermined plane regardless of the angular position of the head relative to the handle.

OSCAR F. WALKER.

REFERENCES CITED

The following references are of record in the file of this patent:

UNITED STATES PATENTS

| Number | Name | Date |
| --- | --- | --- |
| 2,470,444 | Phillippe | May 17, 1949 |